US012624982B2

(12) United States Patent
Bijkerk et al.

(10) Patent No.: US 12,624,982 B2
(45) Date of Patent: May 12, 2026

(54) INTELLIGENT DIGITAL LOAD CELL TRANSDUCER

(71) Applicant: Electronic Theatre Controls, Inc., Middleton, WI (US)

(72) Inventors: Gerard Bijkerk, Enschede (NL); Jacob E. Dunnum, Prairie Du Sac, WI (US); Alex Groot, Arnhem (NL)

(73) Assignee: Electronic Theatre Controls, Inc., Middleton, WI (US)

( * ) Notice: Subject to any disclaimer, the term of this patent is extended or adjusted under 35 U.S.C. 154(b) by 455 days.

(21) Appl. No.: 18/327,151

(22) Filed: Jun. 1, 2023

(65) Prior Publication Data

US 2023/0392973 A1 Dec. 7, 2023

Related U.S. Application Data

(60) Provisional application No. 63/348,077, filed on Jun. 2, 2022.

(51) Int. Cl.
*G01G 3/147* (2006.01)
*G01C 9/02* (2006.01)
(Continued)

(52) U.S. Cl.
CPC .............. *G01G 3/147* (2013.01); *G01C 9/02* (2013.01); *G01G 23/18* (2013.01); *G01L 1/04* (2013.01); *G01P 15/122* (2013.01)

(58) Field of Classification Search
CPC .......... G01G 3/147; G01G 9/02; G01G 23/18; G01G 1/04; G01G 15/122; G01G 23/002; G01G 3/14
(Continued)

(56) References Cited

U.S. PATENT DOCUMENTS

| | | | |
|---|---|---|---|
| 4,804,052 A | 2/1989 | Griffen | |
| 4,815,547 A | 3/1989 | Dillon et al. | |
| | (Continued) | | |

FOREIGN PATENT DOCUMENTS

| | | | |
|---|---|---|---|
| DE | 202009014292 | * | 2/2011 |
| EP | 3372963 A1 | | 9/2018 |
| | (Continued) | | |

OTHER PUBLICATIONS

European Search Report and Written Opinion for Application No. 23176988.6 dated Oct. 10, 2023 (13 pages).
(Continued)

*Primary Examiner* — John E Breene
(74) *Attorney, Agent, or Firm* — Michael Best & Friedrich LLP

(57) ABSTRACT

A load cell transducer including one or more strain gauges configured to generate a first signal indicative of a force applied to the load cell transducer and a sensor configured to generate a second signal indicative of an acceleration and an orientation of the load cell transducer. The load cell transducer further includes a controller communicatively coupled to the one or more strain gauges and the sensor. The controller is configured to determine a weight of an object based on the first signal, determine at least one of a static inclination or an acceleration of the load cell transducer based on the second signal, and output a message indicating an issue of the load cell transducer based on at least one of the static inclination and the acceleration.

20 Claims, 7 Drawing Sheets

(51) Int. Cl.
  *G01G 23/18*       (2006.01)
  *G01L 1/04*        (2006.01)
  *G01P 15/12*       (2006.01)

(58) Field of Classification Search
  USPC ...................................................... 177/25.13
  See application file for complete search history.

(56)                    References Cited

U.S. PATENT DOCUMENTS

| | | | |
|---|---|---|---|
| 4,967,384 | A | 10/1990 | Molinar et al. |
| 5,178,226 | A | 1/1993 | Bowman et al. |
| 5,245,137 | A | 9/1993 | Bowman et al. |
| 6,552,278 | B2 | 4/2003 | Johnson |
| 6,576,849 | B2 | 6/2003 | Bliss et al. |
| 6,987,227 | B2 | 1/2006 | Wakasa |
| 7,221,748 | B1 | 5/2007 | Moore et al. |
| 7,694,589 | B2 | 4/2010 | Mehus et al. |
| 7,750,253 | B2 | 7/2010 | Wineland |
| 7,954,668 | B2 | 6/2011 | Mehus et al. |
| 10,054,479 | B2 | 8/2018 | Nachtigal et al. |
| 10,260,933 | B2 | 4/2019 | Kostic et al. |
| 10,371,566 | B1 | 8/2019 | Smith et al. |
| 10,634,549 | B2 | 4/2020 | Charles et al. |
| 10,900,826 | B2 | 1/2021 | Kostic et al. |
| 11,156,511 | B2 * | 10/2021 | Wade .................... G01L 5/0033 |
| 11,215,499 | B1 | 1/2022 | Polish |
| 11,467,074 | B2 * | 10/2022 | Zanichelli ............... G01L 1/122 |
| 12,066,320 | B2 * | 8/2024 | Polish ..................... G01G 3/14 |
| 2002/0066602 | A1 | 6/2002 | Bliss et al. |
| 2003/0056995 | A1 | 3/2003 | Johnson |
| 2005/0121236 | A1 | 6/2005 | Lauke et al. |
| 2005/0252695 | A1 | 11/2005 | Wakasa |
| 2007/0215391 | A1 | 9/2007 | Wineland |
| 2009/0151474 | A1 | 6/2009 | Mehus et al. |
| 2010/0147876 | A1 | 6/2010 | Mehus et al. |
| 2011/0119028 | A1 * | 5/2011 | Bishop ................. G01G 23/015 |
| | | | 73/1.13 |
| 2012/0060973 | A1 | 3/2012 | Jaeger et al. |
| 2016/0327426 | A1 | 11/2016 | Nachtigal et al. |
| 2017/0003159 | A1 | 1/2017 | Kostic et al. |
| 2017/0234723 | A1 | 8/2017 | Charles et al. |
| 2019/0219438 | A1 | 7/2019 | Kostic et al. |
| 2021/0102837 | A1 | 4/2021 | Kostic et al. |
| 2021/0247229 | A1 * | 8/2021 | Blankley, Jr. ........ G01G 23/363 |
| 2021/0333145 | A1 | 10/2021 | Falk et al. |
| 2022/0011178 | A1 * | 1/2022 | Wade .................... G01L 1/2231 |

FOREIGN PATENT DOCUMENTS

| | | | | |
|---|---|---|---|---|
| WO | 9747728 | A1 | 12/1997 | |
| WO | WO2020223540 | A1 * | 5/2020 | ............. G01G 21/28 |
| WO | 2021210084 | A1 | 10/2021 | |
| WO | 2021242967 | A1 | 12/2021 | |

OTHER PUBLICATIONS

European Patent Office Extended Search Report for Application No. 23176988.6 dated Jan. 16, 2024 (12 pages).
European Patent Office Extended Search Report for Application No. 25178647.1 dated Oct. 6, 2025 (8 pages).

* cited by examiner

INTELLIGENT DIGITAL LOAD CELL TRANSDUCER

RELATED APPLICATIONS

This application claims priority to U.S. Provisional Patent Application No. 63/348,077, filed on Jun. 2, 2022, the entire contents of which are incorporated herein by reference.

FIELD

Aspects described herein relate to digital load cell transducers.

SUMMARY

Load cell transducers are used across a wide variety of industrial and retail applications for providing accurate weight measurements. However, if a load cell transducer becomes unknowingly damaged or mispositioned, the accuracy of the weight measurements produced by the load cell transducer may decrease. Existing solutions for determining whether a load cell transducer has been damaged or mispositioned are difficult and expensive to implement.

In some aspects, load cell transducers described herein include one or more strain gauges configured to generate a first signal indicative of a force applied to the load cell transducer and a sensor configured to generate a second signal indicative of an acceleration and an orientation of the load cell transducer. The load cell transducer further includes a controller communicatively coupled to the one or more strain gauges and the sensor. The controller includes an electronic processor and is configured to determine a weight of an object based on the first signal, determine the acceleration of the load cell transducer based on the second signal, determine whether the acceleration exceeds a threshold, output a message indicating an issue of the load cell transducer, when the acceleration exceeds the threshold.

In some aspects, load cell transducers described herein include one or more strain gauges configured to generate a first signal indicative of a force applied to the load cell transducer and a sensor configured to generate a second signal indicative of an acceleration and an orientation of the load cell transducer. The load cell transducer further includes a controller communicatively coupled to the one or more strain gauges and the sensor. The controller includes an electronic processor and is configured to determine a weight of an object based on the first signal, determine a static inclination of the load cell transducer based on the second signal, determine whether a difference between the static inclination and a target inclination value exceeds a threshold, and output a message indicating an issue of the load cell transducer, when the difference exceeds the threshold.

In some aspects, weighing installations described herein include a weighing surface and a load cell transducer coupled to the weighing surface. The load cell transducer includes one or more strain gauges configured to generate a first signal indicative of a force applied by an object to the weighing surface and a sensor configured to generate a second signal indicative of an acceleration and an orientation of the load cell transducer. The load cell transducer further includes a controller communicatively coupled to the one or more strain gauges and the sensor. The controller includes an electronic processor and is configured to determine a weight of the object based on the first signal, determine the acceleration of the load cell transducer based on the second signal, determine whether the acceleration exceeds a threshold, and output a message indicating an issue of the load cell transducer, when the acceleration exceeds the threshold.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
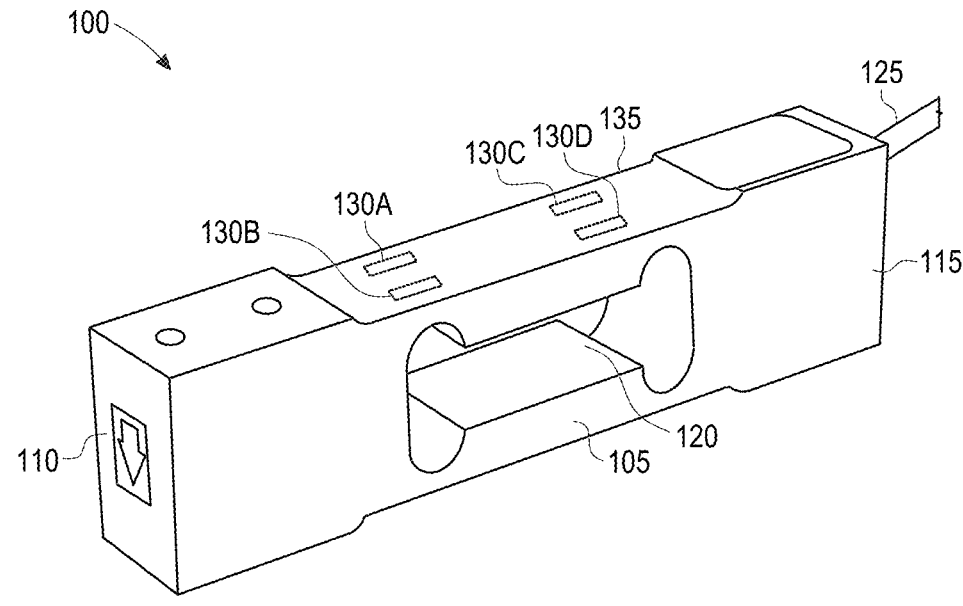
FIG. 1 illustrates a perspective view of a load cell according to some aspects.

FIG. 1 illustrates a perspective view of a load cell transducer 100 that may be included in a weighing installation, such as a scale, in accordance with some aspects. Hereinafter, the load cell transducer 100 may also be referred to as the "load cell" 100. In the illustrated example, the load cell 100 is a single point load cell in which the body 105 is defined by a first end 110, a second end 115, and an aperture 120 formed therebetween between. However, it should be understood that in some instances, the load cell 100 is implemented as a different type of load cell. For example, in some instances, the load cell 100 is implemented as a planar beam load cell, a bending beam load cell, a shear beam load cell, a dual shear beam load cell, an S-type load cell, or some other type of load cell. As further shown, a cable 125 is connected to and extends from the body 105 to electrically connect the load cell 100 to an external device, such as a junction box or computer.

In addition, the load cell 100 may include a plurality of strain gauges 130A-130D for sensing a force applied to load cell 100. In the illustrated embodiment, the strain gauges 130A-130D are connected to the body 105 and are covered by a protective coating, or potting, 135 that is applied to the body 105. In the illustrated example of FIG. 2, the strain gauges 130A-130D are electrically connected in a Wheatstone Bridge configuration. However, it should be understood that in some instances, the strain gauges 130A-130D are electrically connected in a different configuration. Furthermore, it should be understood that in some instances, the load cell 100 includes more or less than four strain gauges 130. For example, in some instances, the load cell 100 includes one strain gauge 130.

Figure 2:
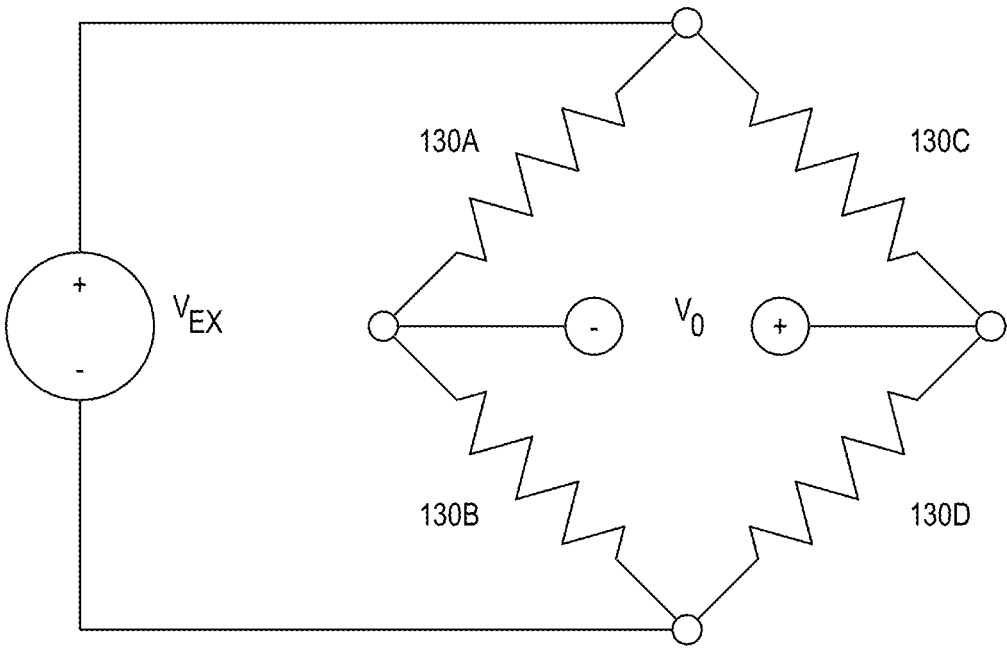
FIG. 2 illustrates a circuit schematic of a Wheatstone Bridge according to some aspects.

In operation, the strain gauges 130A-130D convert a force, or weight, applied to the load cell 100 into an electrical signal. For example, as shown in FIG. 2, the electrical signal is an output voltage signal Vo that is proportional to the force applied to the load cell 100. When the load cell 100 is under load (e.g., being used to weigh an object), the shape of the load cell's body 105 deforms proportionately with the force applied to the load cell 100. The strain gauges 130A-130D, which are connected to the body 105, may also disform in unison with the body 105 thereby causing a corresponding change in the output voltage signal Vo. As will be described in more detail below, the output voltage signal Vo is provided to one or more control electronics which are configured to calculate, or determine, the force applied to the load cell 100 based on the output voltage signal Vo.

Figure 3:
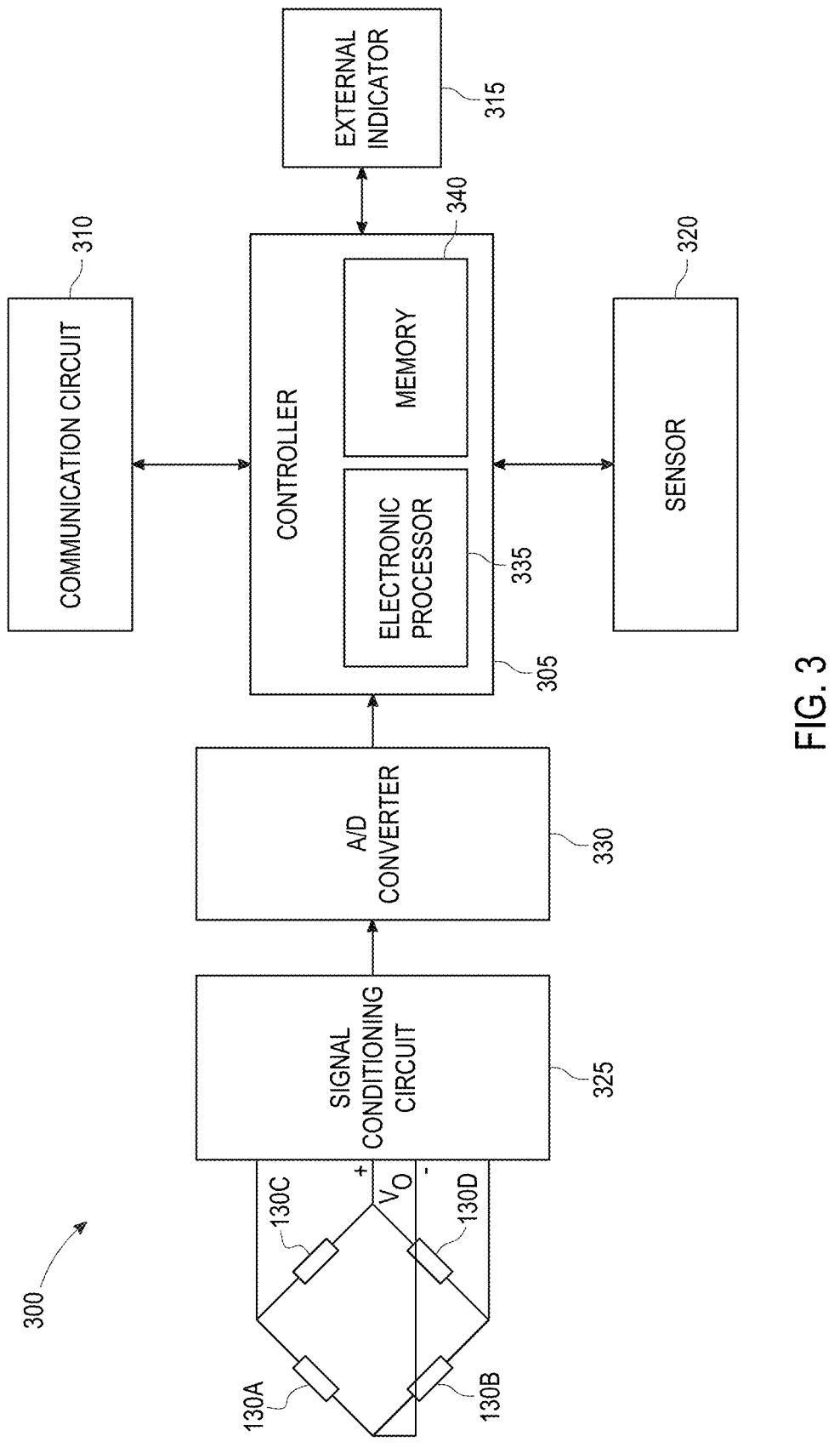
FIG. 3 illustrates a block diagram of a load cell control system according to some embodiments.

FIG. 3 illustrates a block diagram of a control system 300 for the load cell 100 according to some aspects. The control system 300 may include a controller 305 that is electrically and/or communicatively connected to a variety of modules or components of the load cell 100. For example, the controller 305 is connected to the strain gauges 130A-130D, a communication circuit 310, an external indicator 315, and/or a sensor 320 that is configured to sense an orientation, or inclination, and/or an acceleration of the load cell 100.

In the illustrated example, a signal conditioning circuit 325 and an analog-to-digital (A/D) converter 330 are shown to be electrically connected between the strain gauges 130A-130D and the controller 305. The signal conditioning circuit 325 is configured to amplify and/or otherwise modify the electrical signal(s) generated by the strain gauges 130A-130D (e.g., the output voltage signal Vo) before the electrical signals are processed by the controller 305. Similarly, the A/D converter 330 is configured to convert the analog electrical signal(s) generated by the strain gauges 130A-130D into digital signal(s) that are used by the controller 305 to determine a weight of an object. In some instances, the signal conditioning circuit 325 and/or the A/D converter 330 are integrated as one or more components included in the controller 305.

Figure 4:
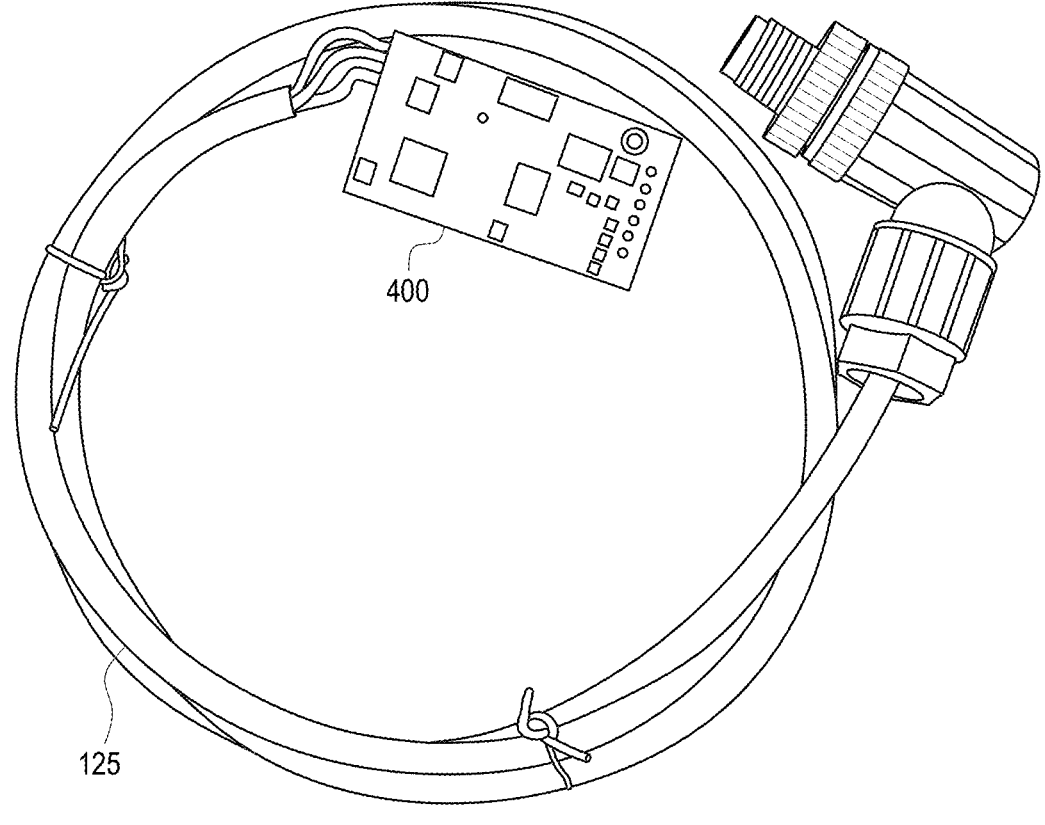
FIG. 4 illustrates printed circuit board included in the load cell of FIG. 1 according to some aspects.

In some instances, one or more of the components included in the control system 300, such as the controller 305 and the sensor 320, are connected to a printed circuit board (PCB) 400. As shown in FIG. 4, the PCB 400 is sized and shaped to be embedded within, or otherwise coupled, to the body 105 of the load cell 100. In some instances, the PCB 400 is received by a slot or a cavity formed within the body 105 such that the PCB 400 and the components connected thereto are embedded within the body 105 (not shown). In other instances, the PCB 400 is coupled to an exterior surface of the load cell's body 105.

In some instances, one or more of the components included in the control system 300 are individually embedded in, or otherwise coupled to, the load cell's body 105. For example, in some instances, the sensor 320 is embedded within the body 105 of the load cell 100 without being connected to a PCB. In such instances, the sensor 320 may be positioned within a slot, a cavity, or some other feature formed within the body 105 (not shown). As another example, in some instances, the controller 305 may be embedded within the body 105 of the load cell 100 without being connected to a PCB. In such instances, the sensor 320 may be positioned within a slot, a cavity, or some other feature formed within the body 105 (not shown). In some instances, the external indicator 315 may be coupled to the load cell's body 105 such that the external indicator 315 is visible to a person looking at the load cell 100.

Referring back to FIG. 3, the controller 305 includes a plurality of electrical and electronic components that provide power, operational control, and/or protection to the components and modules within the controller 305 and/or the load cell 100. For example, the controller 305 includes, among other things, an electronic processor 335 and a memory 340.

The memory 340 includes, for example, a program storage area and a data storage area. The program storage area and the data storage area can include combinations of different types of memory, such as read-only memory (ROM) and random access memory (RAM). Various non-transitory computer readable media, for example, magnetic, optical, physical, or electronic memory may be used. The electronic processor 335 is communicatively coupled to the memory 340 and executes software instructions that are stored in the memory 340, or stored in another non-transitory computer readable medium such as another memory or a disc. The software may include one or more applications, program data, filters, rules, one or more program modules, and other executable instructions. For example, the software may include instructions that, when executed by the electronic processor 335, are used to calculate the weight of an object based on the electrical signal(s) generated by the strain gauges 130A-130D. As another example, the software may include instructions that, when executed by the electronic processor 335, are used to determine whether the load cell 100 is mispositioned and/or has an issue to be corrected (e.g., maintenance is recommended) based on the signal(s) generated by the sensor 320. In some instances, the memory 340 is configured to store a log of position related data associated with the load cell 100 (e.g., inclination, acceleration, etc.).

The communication circuit 310 enables the load cell 100 to communicate with one or more external devices, such as but not limited to a junction box, a computer, and/or a smartphone. In some instances, the communication circuit 310 is configured to communicate with the one or more external devices using a wired connection. In some instances, the communication circuit 310 configured to wirelessly communicate with one or more external devices (e.g., a junction box, a computer, a smartphone, etc.) using radio-frequency (RF) based communication. For example, in such instances, the communication circuit 310 is configured to transmit signals to one or more external devices using a short-range radio communication protocol such as Bluetooth®, Wi-Fi, NFC, ZigBee, and etc. As will be described in more detail below, in some instances, the communication circuit 310 transmits signals indicative of a detected impact to the load cell 100, an issue of the load cell 100, and/or a static inclination of the load cell 100 to the one or more external devices.

The external indicator 315 is configured to display a condition of, or information associated with, the load cell 100. For example, the external indicator 315 is configured to alert a user to a change in the position of the load cell 100 (e.g., when the load cell 100 improperly oriented). As another example, the external indicator 315 is configured to alert a user to the occurrence of a high impact collision with the load cell 100 (e.g., when the load cell 100 is struck by a machine, such as a forklift). As another example, the external indicator 315 is configured to alert a user that an issue is occurring with the load cell 100 and maintenance of the load cell 100 is recommended. In some instances, the external indicator 315 is implemented as one or more lights, such as one or more light emitting diodes (LEDs). In some instances, the external indicator 315 includes elements (e.g., a speaker) that convey information to a user through audible or tactile outputs.

Figure 5:
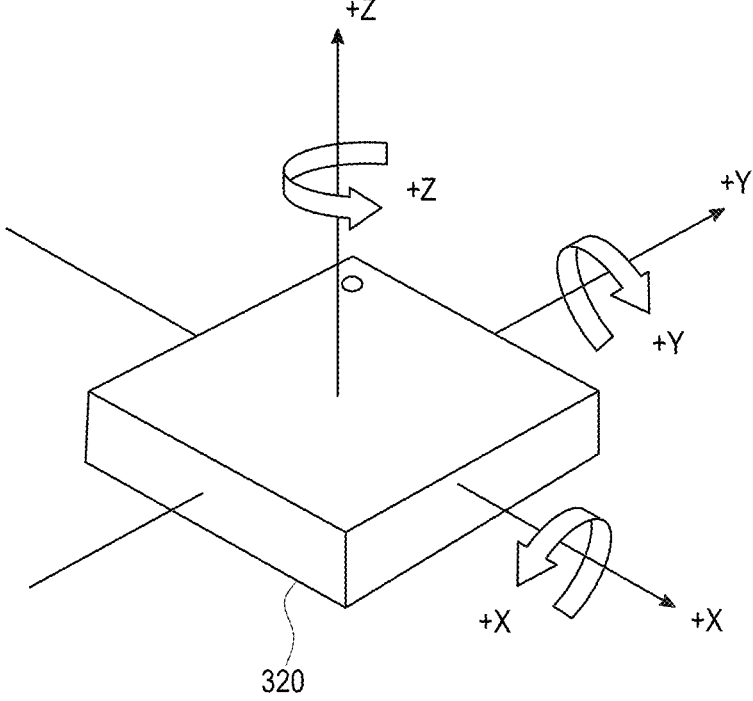
FIG. 5 illustrates a perspective view of an orientation and acceleration sensor included in the load cell of FIG. 1 according to some aspects.

The sensor 320 is configured to sense an orientation, or inclination, of the load cell 100 along one or more axes. In addition, the sensor 320 is configured to detect an acceleration of the load cell 100 along one or more axes. FIG. 5 illustrates a perspective view of the sensor 320 included in the load cell 100 according to some aspects. In the illustrated example, the sensor 320 is implemented as 6-degrees of freedom (6-DOF) sensor that includes an accelerometer and a gyroscope. As shown, the sensor 320 is configured to sense an acceleration along one or more of the x-axis, the y-axis, and the z-axis. Furthermore, as shown, the sensor 320 is also configured to sense an inclination of the load cell 100 with respect to one or more of the x-axis, the y-axis, and the z-axis. In some instances, the sensor 320 is implemented as a 9-degrees of freedom (9-DOF) sensor, which includes an accelerometer, a gyroscope, and a magnetometer (e.g., a compass). In some instances, the sensor 320 is implemented as an accelerometer. In some instances, the sensor 320 is implemented as a gyroscope. In some instances, the sensor 320 is implemented as a different type of sensor.

Figure 6:
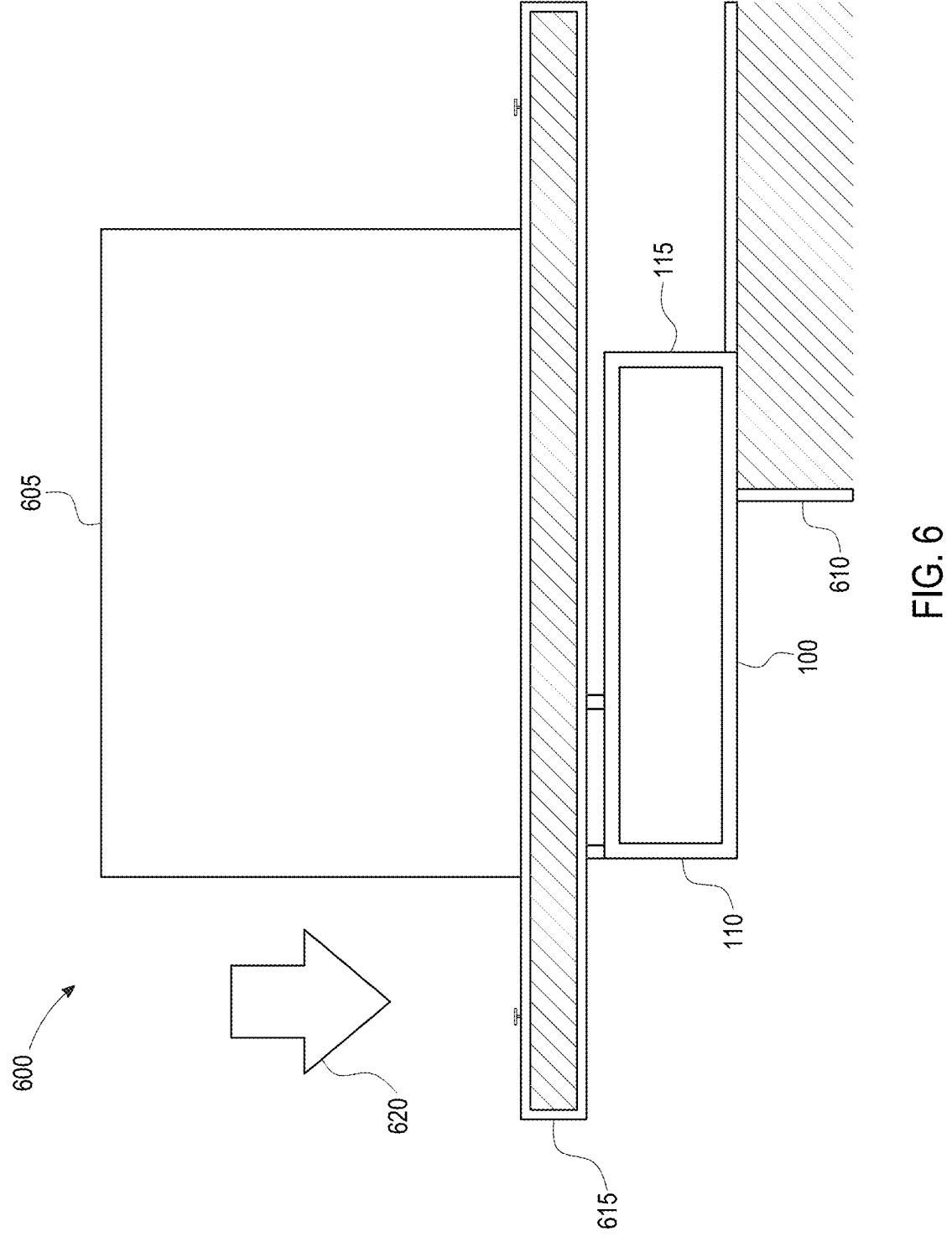
FIG. 6 illustrates an example weighing installation that includes the load cell of FIG. 1 according to some aspects.

FIG. 6 illustrates an example weighing installation 600 that uses the load cell 100 to weigh objects, such as an object 605. It should be understood that the weighing installation 600 is provided merely as an example and does not limit the implementation of the load cell 100 in any way. For example, it should be understood that the load cell 100 may be implemented in a weighing installation that is different than the illustrated weighing installation 600. Furthermore, it should be understood that the load cell 100 may be implemented in an application that is different than a weighing application. For example, the load cell 100 may be implemented in an application for measuring a downward force, an upward force, and/or a sideward force applied by an object. In some instances, more than one load cell 100 is implemented in a weighing installation.

Referring back to FIG. 6, the weighing installation 600 includes, among other things, the load cell 100, a support structure 610, and/or a weighing surface 615. The second end 115 of the load cell 100 may be mechanically coupled to the support structure 610 such that the first end 110 of the load cell 100 extends outward from the support structure 610. The weighing surface 615 may be mechanically coupled to and supported by the first end 110 of the of the load cell 100. When an object 605 is placed on the weighing surface 615, the object 605 applies a downward force 620 onto the first end 110 of the load cell 100. As described above, the strain gauges 130A-130D generate an electrical signal (e.g., the output voltage signal Vo) that is proportional to the downward force 620 applied by the object, and correspondingly, the controller 305 determines the weight of the object 605 based on the electrical signal generated by the strain gauges 130A-130D.

When the load cell 100 is properly installed in the weighing installation 600 (e.g., the inclination of the load cell 100 is within a target band), the load cell 100 produces accurate weight measurements. That is, when the inclination of the load cell 100 is within an acceptable, or target, threshold and the load cell 100 is properly positioned, the controller 305 is able to accurately determine the weight of the object 605 based on the electrical signal(s) generated by the strain gauges 130A-130D. However, the accuracy of weight measurements recorded by the load cell 100 decreases when the load cell 100 becomes mispositioned, when the inclination of the load cell 100 is outside of the target threshold, and/or when the load cell 100 becomes misaligned.

For example, the load cell 100 may become mispositioned when a machine, such as a forklift, collides with, or otherwise impacts, the weighing installation 600. Since the strain gauges 130A-130D are configured to measure force applied to the load cell 100 in only one direction, a transverse mechanical force applied by a machine to the load cell 100 along one or more of the axes that are not measured by the strain gauges 130A-130D may go undetected. Thus, in some instances, a mispositioned load cell 100 operates with decreased accuracy when collisions between a machine and the load cell 100 and/or the weighing installation 600 go undetected. Accordingly, to prevent inaccurate operation of a mispositioned load cell 100, the controller 305 is configured to determine whether the load cell 100 is properly positioned based on signals received form the sensor 320.

In some instances, the controller 305 is configured to detect when a large mechanical force is applied to the load cell 100 along one or more axes based on signals received from the sensor 320. For example, in operation, the sensor 320 measures acceleration of the load cell 100 along the x-axis, the y-axis, and/or the z-axis, and correspondingly, transmits signals indicative of the acceleration of the load cell 100 along the x-axis, the y-axis, and/or the z-axis to the controller 305. When a large force is applied to the load cell 100 and/or the weighing installation 600 in which the load cell 100 is installed (e.g., a forklift collides with the load cell 100, a large object is dropped on the weighing installation 600, etc.), the sensor 320 senses an increase in acceleration along one or more of the x-axis, the y-axis, and the z-axis. Accordingly, the controller 305 determines that a large force has been applied to the load cell 100 by detecting increased acceleration values included in the signals received from the sensor 320.

In some instances, the controller 305 is configured to determine whether the acceleration value(s) included in signals received from the sensor 320 (e.g., the acceleration of the load cell 100) exceed a threshold value. When the controller 305 determines that the acceleration of the load cell 100 exceeds the threshold value, the controller 305 determines that an impact has occurred and the load cell 100 may be mispositioned. Accordingly, in some instances, the controller 305 transmits, by the communication circuit 310, a message to one or more external devices that indicates the load cell 100 and/or the weighing installation 600 in which the load cell 100 is implemented has been impacted when the controller 305 determines that the acceleration of the load cell 100 exceeds the threshold value. In some instances, the controller 305 transmits (e.g., outputs), by the communication circuit 310, a message to one or more external devices that indicates an issue of the load cell 100 and that maintenance is recommended when the controller 305 determines that the acceleration of the load cell 100 exceeds the threshold value. In some instances, the controller 305 activates the external indicator 315 when the controller 305 determines that the acceleration of the load cell 100 exceeds the threshold value. For example, in some instances, the controller 305 illuminates an LED included in the external indicator 315 when the controller 305 determines that the acceleration of the load cell 100 exceeds the threshold value. In some instances, the controller 305 logs a high impact event in the memory 340 when the controller 305 determines that the acceleration of the load cell 100 exceeds the threshold value.

The controller 305 is further configured to determine a static inclination of the load cell 100 along one or more axes based on signals received from the sensor 320. The static inclination may be determined, for example, based on signals generated by the sensor 320 that are indicative of an amount rotation about one or more of the x-axis, the y-axis, and/or the z-axis. In some instances, the controller 305 determines whether the static inclination of the load cell 100 is within a target threshold based on one or more signals received from the sensor 320. For example, when the load cell 100 is installed in a weighing installation (e.g., the weighing installation 600), a target inclination value associated with a properly installed load cell 100 may be determined and stored in the memory 340 of controller 305. Accordingly, in such an example, the controller 305 determines whether the current static inclination of the load cell 100 is within a target threshold of the target inclination value associated with the properly installed load cell 100. In some instances, the controller 305 determines whether a percentage difference between the current static inclination of the load cell 100 along one or more axes and the target inclination value exceeds a threshold (e.g., +/−5%).

In some instances, the controller 305 transmits, by the communication circuit 310, a message to one or more external devices that indicates the load cell 100 is mispositioned when the controller 305 determines that the current static inclination of the load cell 100 is not within a target threshold of the target inclination value. In some instances, the controller 305 transmits, by the communication circuit 310, a message to one or more external devices that indicates an issue of the load cell 100 and that maintenance is recommended when the controller 305 determines that the current static inclination of the load cell 100 is not within a target threshold of the target inclination value. In some instances, the controller 305 activates the external indicator 315 when the controller 305 determines that the current static inclination of the load cell 100 is not within a target threshold of the target inclination value. For example, in some instances, the controller 305 illuminates an LED included in the external indicator 315 when the controller 305 determines that the current inclination of the load cell 100 is not within a target threshold of the target inclination value. In some instances, the controller 305 logs a high impact event in the memory 340 when the controller 305 determines that the current static inclination of the load cell 100 is not within a target threshold of the target inclination value.

In some instances, the controller 305 normalizes weight measurements produced by the load cell 100 based on the current static inclination of the load cell 100. That is, in some instances, the controller 305 factors in the current static inclination of the load cell 100 when determining the weight of an object being measured by the load cell 100 based on the electrical signal generated by the strain gauges 130A-130D. For example, the controller 305 normalizes, or compensates, electrical signals generated by the strain gauges 130A-130D based on current static inclination of the load cell 100.

In some instances, predictive, or preventative, maintenance is performed on the load cell 100 based on measurements taken by the sensor 320. For example, in some instances, the controller 305 maintains a log of static inclination values of the load cell 100 over time in the memory 340. In such instances, the controller 305 may be configured to determine when an issue has occurred with the load cell 100 and maintenance will be recommended based on a change in the static inclination of the load cell 100 over time. For example, the controller 305 predicts a time or date by which an issue will occur with the load cell 100 and maintenance will be recommended based on a detected change in the static inclination values stored in the memory

340. In some instances, the controller 305 transmits, by the communication circuit 310, the log of static inclination values to one or more external devices. In such instances, a user of the external device determines whether an issue has occurred with the load cell 100 and maintenance is recommended based on the static inclination values of the load cell 100 stored in the log.

In some instances, the controller 305 is configured to compensate weight measurements recorded by the load cell 100 based on dynamic movements of the weighing installation 600 in which the load cell 100 is implemented. For example, in some instances, the load cell 100 is included in a weighing installation that is located on a boat. In such instances, waves cause movement of the boat, and correspondingly, movement the weighing installation that may result in the load cell 100 producing inaccurate weight measurements. Accordingly, the controller 305 compensates, or normalizes, the weight measurements produced by the load cell 100 with acceleration measurements taken by the sensor 320 while the boat moves. As another example, in some instances, dynamic movements of the weighing installation 600 in which the load cell 100 is implemented include vibrations occurring within the weighing installation 600. Accordingly, in such instances, the controller 305 compensates, or normalizes, weight measurements produced by the load cell 100 based on the vibrations detected by the sensor 320.

In some instances, the controller 305 is configured to normalize weight measurements produced by the load cell 100 with respect to Earth's gravity. As Earth's gravity is not constant, accuracy of the load cell 100 may vary as the altitude of the load cell 100 changes. Accordingly, for instances in which the load cell 100 is implemented in a weighing installation that is located at a relatively high altitude, the controller 305 normalizes weight measurements produced by the load cell 100 with respect to gravitational acceleration measurements recorded by the sensor 320. In some instances, the latitude, longitude, and/or altitude of the load cell 100 are provided to the controller 305 (e.g., via the communication circuit 310) and the controller 305 normalizes weight measurements produced by the load cell 100 with respect to the latitude, longitude, and/or altitude of the load cell 100. In such instances, a higher degree of accuracy in measuring the weight of an object is achieved.

Figure 7:
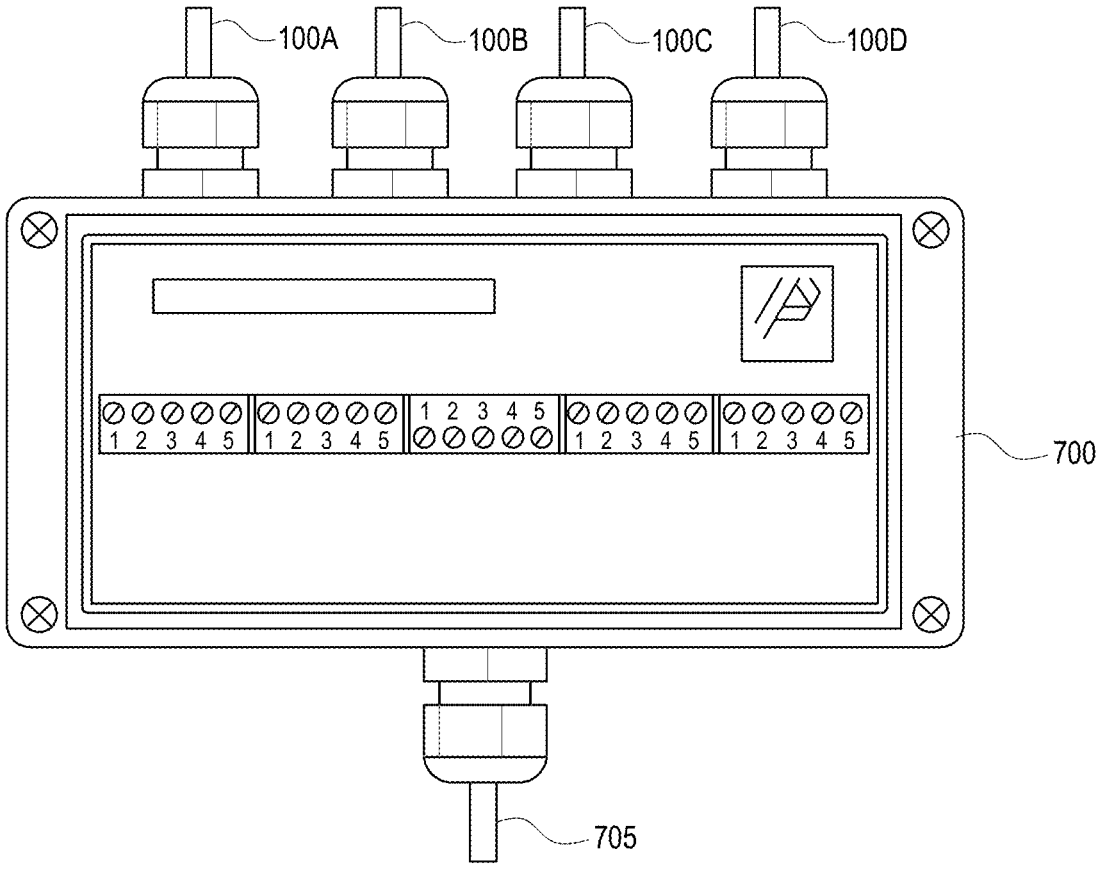
FIG. 7 illustrates a load cell junction box according to some aspects.

In some instances, one or more of the above-described functions of the controller 305 are performed external to the load cell 100. For example, in some instances, the controller 305, the communication circuit 310, and/or the external indicator 315 are included in a junction box, such as the junction box 700 illustrated in FIG. 7, that is electrically connected to the load cell 100. In such instances, electrical signals generated by the strain gauges 130A-130D and/or the sensor 320 are transmitted to the controller 305 by the cable 125. It should be understood that for instances in which the controller 305 is located in the junction box 700, the controller 305 is still configured to perform the weight determination and/or position determination functions described herein with respect to the controller 305 that is embedded in the load cell's body 105.

In some instances in which the controller 305 is included in a junction box 700, the signal conditioning circuit 325 and/or the A/D converter 330 are included in the load cell 100 such that the generated electrical signals are modified and/or converted prior to leaving the load cell 100. In other instances in which the controller 305 is included in a junction box 700, the signal conditioning circuit 325 and/or the A/D converter 330 are also included in the junction box

700. In the illustrated example of FIG. 7, the junction box 700 is respectively connected to a plurality of load cells 100A-100D by the cables 125A-125D. In this example, the controller 305 included in the junction box 700 is configured to determine the respective loads and/or positions (e.g., inclination, acceleration, etc.) of each of the load cells 100A-100D. Furthermore, in the illustrated example, the communication circuit 310 included in the junction box 700 is configured to communicate with an external device, such as a computer, using the wired connection 705.

Thus, aspects described herein provide, among other things, digital load cell transducers that include position detection capabilities. Various features and advantages are set forth in the following claims.

What is claimed is:

1. A load cell transducer comprising:
   one or more strain gauges configured to generate a first signal indicative of a force applied to the load cell transducer;
   a sensor configured to generate a second signal indicative of an acceleration and an orientation of the load cell transducer; and
   a controller including an electronic processor, the controller communicatively coupled to the one or more strain gauges and the sensor, the controller configured to:
   determine a weight of an object based on the first signal;
   determine the acceleration of the load cell transducer based on the second signal;
   determine whether the acceleration exceeds a threshold; and
   output a message indicating an issue of the load cell transducer, when the acceleration exceeds the threshold.

2. The load cell transducer of claim 1, wherein the issue is a recommendation for maintenance of the load cell transducer.

3. The load cell transducer of claim 1, wherein the sensor and the controller are mounted to a printed circuit board (PCB); and
   wherein the PCB is received by a cavity formed in a body of the load cell transducer.

4. The load cell transducer of claim 1, further comprising an external indicator communicatively coupled to the controller; and
   wherein the controller is further configured to activate the external indicator when the acceleration exceeds the threshold.

5. The load cell transducer of claim 1, wherein the controller includes a memory; and
   wherein the controller is further configured to log an impact event in the memory when the acceleration exceeds the threshold.

6. The load cell transducer of claim 1, wherein the controller is positioned in a junction box that is electrically connected to the load cell transducer.

7. The load cell transducer of claim 1, wherein the controller is further configured to:
   determine a static inclination of the load cell transducer based on the second signal;
   determine whether a difference between the static inclination and a target inclination value exceeds a second threshold; and
   output a second message indicating the issue of the load cell transducer, when the difference exceeds the threshold.

8. The load cell transducer of claim 7, wherein the controller includes a memory; and wherein the controller is further configured to log the static inclination in the memory when the difference exceeds the second threshold.

9. The load cell transducer of claim 7, wherein controller is further configured to normalize the determined weight of the object based on that static inclination of the load cell transducer.

10. A load cell transducer comprising:

one or more strain gauges configured to generate a first signal indicative of a force applied to the load cell transducer;

a sensor configured to generate a second signal indicative of an acceleration and an orientation of the load cell transducer; and a controller including an electronic processor, the controller communicatively coupled to the one or more strain gauges and the sensor, the controller configured to:

determine a weight of an object based on the first signal;

determine a static inclination of the load cell transducer based on the second signal;

determine whether a difference between the static inclination and a target inclination value exceeds a threshold; and output a message indicating an issue of the load cell transducer, when the difference exceeds the threshold.

11. The load cell transducer of claim 10, wherein issue is a recommendation for maintenance of the load cell transducer.

12. The load cell transducer of claim 11, wherein the sensor and the controller are mounted to a printed circuit board (PCB); and wherein the PCB is received by a cavity formed in a body of the load cell transducer.

13. The load cell transducer of claim 10, further comprising an external indicator communicatively coupled to the controller; and wherein the controller is further configured to activate the external indicator when the difference exceeds the threshold.

14. The load cell transducer of claim 10, wherein the controller includes a memory; and wherein the controller is further configured to log the static inclination in the memory when the difference exceeds the threshold.

15. The load cell transducer of claim 10, wherein the controller is further configured to normalize the determined weight of the object based on that static inclination of the load cell transducer.

16. The load cell transducer of claim 10, wherein the controller is positioned in a junction box that is electrically connected to the load cell transducer.

17. The load cell transducer of claim 10, wherein the controller is further configured to:

determine the acceleration of the load cell transducer based on the second signal;

determine whether the acceleration exceeds a second threshold; and output a second message indicating an issue of the load cell transducer to an external device when the acceleration exceeds the second threshold.

18. The load cell transducer of claim 17, wherein the controller includes a memory; and wherein the controller is further configured to log an impact event in the memory when the acceleration exceeds the second threshold.

19. A weighing installation comprising:

a weighing surface; and a load cell transducer coupled to the weighing surface, the load cell transducer including:

one or more strain gauges configured to generate a first signal indicative of a force applied by an object to the weighing surface;

a sensor configured to generate a second signal indicative of an acceleration and an orientation of the load cell transducer; and a controller including an electronic processor, the controller communicatively coupled to the one or more strain gauges and the sensor, the controller configured to:

determine a weight of the object based on the first signal;

determine the acceleration of the load cell transducer based on the second signal;

determine whether the acceleration exceeds a threshold; and output a message indicating an issue of the load cell transducer, when the acceleration exceeds the threshold.

20. The weighing installation of claim 19, wherein the controller is further configured to:

determine a static inclination of the load cell transducer based on the second signal;

determine whether a difference between the static inclination and a target inclination value exceeds a second threshold; and output a second message indicating the issue of the load cell transducer, when the difference exceeds the threshold.

* * * * *